United States Patent Office 3,249,158
Patented May 3, 1966

3,249,158
PLUGGING MATERIALS FOR VERTICAL
FRACTURES
William F. Kieschnick, Jr., Lafayette, La., and Thomas K.
Perkins and Reece E. Wyant, Dallas, Tex., assignors to
The Atlantic Refining Company, Philadelphia, Pa., a
corporation of Pennsylvania
No Drawing. Filed Feb. 19, 1962, Ser. No. 174,276
6 Claims. (Cl. 166—29)

This invention relates to vertical formation fracturing of wells utilized in oil and gas production. More specifically this invention pertains to vertical formation fracturing wherein the rate of fluid production from or fluid injection into the lower portion of a vertical fracture is not increased as much as it is in the upper portion of the fracture. Even more specifically, this invention concerns vertical fracturing of oil and gas wells without increasing the water production therefrom.

In oil and gas production, it is common practice to improve the rate of production of or the rate of injection into wells by creating new fractures or by extending old fractures in oil and gas wells. Generally, a fracture is created by disposing a fracturing fluid opposite the formation to be fractured. After the fracturing fluid is spotted opposite the formation to be fractured, sufficient pressure is applied to the fracturing fluid to cause it to crack the formation thereby forming a fracture therein, or thereby opening a pre-existing fracture. Usually, some portion of the fracturing fluid will contain a fracture propping agent. Leak-off or subsequent removal of the fracturing fluid will then deposit the propping agent between the walls of the fracture and the fracture will be propped at least partially open when the pressure of the fracturing fluid is reduced. The premeability through the propping agent deposited in the fracture is usually greater than through the unfractured formation; therefore, the ease with which the fluids can be produced from or injected into the formation containing such propped fractures is improved. Frequently, these propping materials or agents are suspended in the fracturing fluid and special steps are taken to reduce the falling rate or settling rate of the propping agents in the fracturing fluid so that a uniform, vertical layer of propping agent is present when the fracture is allowed to close. Similarly, special additives are added to the fracturing fluid to reduce the leak-off rate to the formation and to increase its viscosity and particle suspending power. Moreover, the propping materials are carefully selected for size, composition, strength and concentration to provide a highly permeable mass when subjected to the pressure of the formation being fractured.

Unfortunately, the oil or gas formations which are to be fractured frequently overlie an adjacent undesirable water producing zone whose rate of production is increased when the oil or gas producing formation is fractured. Increasing the undesirable water production in oil or gas wells increases the lifting cost of the desired fluid and causes many other related producing problems well known to those skilled in the art. This is especially true in oil wells wherein the oil undergoes bottom water drive. It is, therefore, desirable to provide a fracturing technique that does not increase the undesirable water production of oil or gas wells or mixtures thereof as much as it does the oil or gas production. Similarly, in some injection wells it is desirable to fracture only upper zones of a multiple zone formation so that the rate of injection into only these zones is increased. Since, however, in a single formation, it is usually difficult to adequately control the vertical height of a fracture, usually, any attempt to fracture these particular zones will also result in a fracture of lower zones. It is desirable, therefore, to also provide a fracturing technique that increases the rate of injection into desirable upper zones more than it increases the rate of injection into undesirable lower zones which are interconnected by the vertical fracture.

Accordingly, an object of this invention is to provide methods and compositions for increasing the permeability of subsurface earth formations without a proportional increase in the production of undesirable fluids.

A further object of this invention is to provide compositions and methods for vertical fracturing of subsurface earth formations wherein the permeability of a lower portion of the fracture is not increased to the extent that it is in the upper portion of the fracture.

Another object of this invention is to provide methods of vertically fracturing oil and gas wells wherein the rate of oil or gas production is increased without a proportional increase in water production.

Still another object of this invention is to provide methods and compositions for at least partially sealing a lower portion of a vertical fracture.

Yet another object of this invention is to accomplish the above objects with a minimum of plugging material.

Still a further object of this invention is to accomplish the above objects utilizing particulate materials in a narrow particle size range.

This application is related to U.S. patent application, Serial No. 659,496, filed May 6, 1957, in the name of William J. McGuire, Jr., et al., now Patent No. 2,950,247; U.S. patent application, Serial No. 51,149, filed August 22, 1960, in the name of William J. McGuire, Jr., et al., now Patent No. 3,155,158; U.S. patent application, Serial No. 51,078, filed August 22, 1960, in the name of William J. McGuire, Jr., et. al., now Patent No. 3,127,937; and U.S. patent application, Serial No. 88,635, filed February 13, 1961, in the name of William J. McGuire, Jr., et al., now Patent No. 3,164,208, all assigned to the same assignee as the present application.

In accordance with this invention, during vertical fracturing of subsurface earth formations, crushable or deformable solid particles, or mixtures thereof, having a minimum dimension at least as great as 0.03 inch and a maximum strength per particle of ten pounds per particle, are employed to shut off a lower portion of the vertical fracture. The crushable or deformable solid particles are water insoluble and are selected from the group consisting of coal, coke, brittle plastics, brittle glass, rubber, pliable plastics, tar and hydrogenated vegetable oils. The particles are mixed with a carrier fluid in which the particles settle at a rate in excess of 0.1 foot per minute. The mixture is pumped into the vertical fracture where the deformable or crushable particles settle from the carrier fluid. When the fracture closes, the deposited particles yield to form a relatively impermeable mass. This invention, therefore, describes compositions and methods for reducing the flow of fluids through lower portions of vertical fractures in oil or gas wells, or combinations thereof. The vertical fractures may be either newly created fractures or pre-existing fractures, natural or manufactured. The fractures may communicate with one or more horizontal fractures. The fractures may be concerned with formations from which fluids are produced or formations into which fluids are injected. In other words, this invention is useful whenever and wherever it is desirable to reduce the flow of fluids through the lower portion of a vertical fracture. The fluids may be oil, gas, or water, or mixtures thereof, depending on the nature and utility of the well and formation concerned.

As used herein, crushable solid particles are frangible solid particles that will crush or pulverize when the fracture closes and the average individual particle strength of the particles must be less than ten pounds per particle. The particles upon pulverizing form a relatively impermeable mass of solid particles which effectively seal and conform to the lower portion of a vertical fracture. Usually, the mass of crushed particles has a permeability to fluid flow which is not substantially greater than the permeability of the unfractured formation. In all cases, the premeability to fluid flow through the mass of crushed particles is much less than the permeability through the upper portion of the fracture. Examples of such crushable materials are coal, coke, brittle plastics, glass and the like.

As used herein, deformable solid particles are nonfrangible, pliable particles that, when the fracture closes, yield changing their shape to conform to and seal against their surroundings. Such particles will have an average individual particle strength of less than ten pounds per particle. The deformed particles form a relatively impermeable mass which effectively seals the lower portion of a vertical fracture. Usually, the mass of deformed particles has a permeability to fluid flow which is not substantially greater than the permeability of the unfractured formation. In all cases, the permeability to fluid flow through the mass of deformed particles is much less than the permeability through the upper portion of the fracture. Examples of such materials are rubber, pliable plastics, tar, hydrogenated vegetable oils and the like.

Both crushable and deformable particles of this invention must yield when the fracture closes, therefore, a pack of these particles should have a strength of less than 0.7 pound per square inch per foot of depth that the fracture lies below the earth's surface and the particles must have an average particle strength of less than 10 pounds per particle.

The deformable or crushable solid particles of this invention are employed in a carrier fluid wherein the solid particles have a settling rate of at least 0.1 foot per minute. Otherwise, the carrier fluid may be any fluid suitable for fracturing subsurface earth formations and includes hydrocarbons, water, crude oil, acids, kerosene, emulsions and gels thereof, mixtures thereof, fluids with either low or rapid leak-off properties, and the like. The selection depends on the type of solid particle being used and the carrier fluid must not dissolve or react with all of that material. The selection of a particular carrier also depends on the well known factors governing selection of a fracturing fluid, such as, the physical and chemical properties of the formation, the depth of the formation, available pumping equipment, vertical length and width of the fracture, fracturing pressure and the like. The volume of carrier fluid utilized in any one treatment will vary according to concentration of particles, their settling rate, the type of treatment, the carrier fluid flow rate, length and width of the fracture, and other similar conditions. The essential qualities of the carrier fluid are, therefore, that it must provide a pumpable mixture wherein the solid particles have a falling rate of at least 0.1 foot per minute.

The crushable and deformable particles of this invention may be combined with an inexpensive filler material, like sand, provided that the filler material has a settling rate in the carrier fluid of at least 0.1 foot per minute and provided further there is sufficient deformable or crushable material, or both to seal the openings between the filler particles when the fracture closes. The concentration or volume of deformable or crushable material or both, therefore, should be at least fifty percent by volume of the filler material. The size of the particles of the filler material will be governed by the same factors that control the size of the deformable or crushable particles.

Because the compositions of this invention are crushable or deformable, the materials may be employed in a narrow size range. Preferably, the particles will be of about the same size as the proppant utilized in the upper, unplugged portion of the fracture; however, in no case will the size of the crushable and deformable particles be less than 0.03 inch. The more usual particle size range will be between 0.03 and 0.15 inch.

The concentration of deformable or crushable materials in the carrier fluid will vary according to specific operating conditions; however, normally the maximum concentration will not exceed 10 pounds of solid particles per gallon of carrier fluid and the minimum concentration will not be less than 0.1 pound per gallon.

As stated previously, the solid particle-form plugging material must have a falling rate in the carrier fluid of at leaest 0.1 foot per minute. The falling rate will usually be between 1 foot per minute and 40 feet per minute depending on the extent of the fracture opening and the flow rate of the carrier fluid. Preferably, for most fracturing treatments, the falling rate will be between 1 foot per minute and 20 feet per minute.

The composition just described may be employed in any well treating process wherein the formation is vertically fractured and it is desirable to decrease the permeability in a portion of a fracture below that of the upper propped portion. Preferably, the plugging compositions are utilized in the following general manner. A mixture of the carrier fluid and deformable and/or crushable particles of the size, composition and concentration already listed is prepared and the resulting mixture is injected into the borehole and spotted opposite the zone which is either to be fractured or which is already fractured. The mixture is pressurized into the fracture where the plugging particles settle from the carrier fluid at a rate exceeding one-tenth foot per minute. The particles collect in the lower portion of the fracture until the desired layer is formed. Immediately following injection of the carrier fluid and plugging particles, in one continuous operation, a mixture of a second carrier fluid and a propping agent is injected into the upper open portion of the fracture in such manner as to deposite in the fracture a uniform arrangement of propping material. Thereafter, the pressure on the carrier fluid is reduced. When the pressure is reduced, the fracture attempts to close and the walls of the fracture exert sufficient force on the crushable, or deformable particles, or mixtures thereof, to cause these particles to undergo a physical alteration. If crushable particles are used, the particles pulverize forming particles of lesser size and varying sizes, thereby compressing the particles and decreasing the fluid passages or voids between the particles. If deformable particles are used, the particles compact and coalesce, thereby decreasing the fluid passages or voids between the particles. If a mixture of such materials is used, the particles undergo both phenomena just described. The resulting pack of yielded particles has a permeability to fluid flow less than the permeability of the upper part of the fracture. On the other hand, the upper part of the fracture remains open to fluid flow since it is propped by a proppant of sufficient strength, concentration and size designed to increase the permeability to fluid flow.

In other instances, it may be desirable to reduce the fluid flow through the plugging material particles before the proppant is added. In such case, it may be practical to use a plugging particle larger than the proppant particle and let the fracture partially close before adding the proppant. In this latter instance, the partial reduction in fracture opening will compress the larger plugging particles and make the deposited pack of plugging particles less pervious to fluid flow therethrough. Thereafter, the proppant will be added to the upper, unplugged portion.

As stated previously, normally, however, the plugging material and proppant will be of essentially the same size.

While the above given general procedure for plugging the lower portion of a vertical fracture may be combined with most fracturing procedures, the procedure just presented is especially suited for use with the fracturing techniques disclosed by U.S. Patent No. 2,950,247, and U.S. Patent No. 3,127,937.

Employing the techniques disclosed by U.S. Patent No. 2,950,247, immediately after depositing the plugging particles in the lower portion of the vertical fracture, a fluid suspension of a manufactured, formable material of generally spherical shape is forced into the upper, unplugged portion of the fracture. The particles have a diameter in excess of 0.03 inch and are capable of supporting a load above 40 pounds per particle without fragmentation. Preferably, the formable material is selected from the group consisting of alumina and aluminum particles and mixtures thereof. After the manufactured, formable material is deposited in the upper, unplugged portion of the fracture, the pressure of the fracturing fluid is reduced and the fracture allowed to close in the manner described previously.

In accordance with the teachings of U.S. Patent No. 3,127,937, after the plugging material having a settling rate of at least 0.1 foot per minute in the carrier fluid is deposited in the lower portion of the fracture, a plugging agent having a specific gravity less than that of the carrier fluid is added to the carrier fluid and is deposited in the upper portion of the fracture. After the lighter plugging material is deposited, a suitable propping agent is added to the carrier fluid to deposit a pack of permeable material between the two layers of plugging material. In this manner, only the flow of fluids through the propped, unplugged portion is greatly increased.

Following the disclosure of U.S. Patent No. 3,164,208, after the plugging particles of this invention are deposited, there is placed in the unplugged portion of the fracture on a suitable carrier fluid a single layer or less than a single layer of solid, particle-form propping agent of preselected size and strength such that the particles are sparsely distributed in the fracture while maintaining sufficient fracture opening to allow free passage of the fluids therethrough. Preferably, the fracture is initiated with a penetrating fluid to establish the desired pressure and pumping rate. Next, a non-penetrating fluid is injected into the fracture to extend the fracture and to plug the pores in the fracture walls and prevent subsequent leak-off of other fluids injected into the fracture. Thereafter, the plugging solid particles of this invention are deposited in the lower portion of the fracture. After the plugging particles are deposited, a sparse population of propping agent is placed in the unplugged portion of the fracture in a manner described in the foregoing mentioned U.S. Patent No. 3,164,208.

Although the foregoing description of this invention was essentially limited to vertical fracturing of oil producing zones which overlie an adjacent water producing zone, it is understood that most of the methods and compositions described herein can be utilized in any vertical fracturing operation where it is desirable to increase the rate of production from or the rate of injection into only the upper portion of the area fractured or to reduce the rate of production from or the rate of injection into the lower portions of the fractured area.

In the foregoing description of this invention, there were presented preferred embodiments of the compositions and methods of this invention along with certain modifications thereto but it is understood that all of the modifications have not been described and that further modifications can be suggested by those skilled in the art. This invention intends to cover such modifications as fall within the spirit of the appended claims.

We claim:
1. A method of increasing the permeability to fluid flow in only an upper portion of a vertical fracture in a subsurface earth formation traversed by a well bore, which method comprises forming a first mixture of a first carrier fluid and a water-insoluble, particle-form material having a minimum dimension at least as great as 0.03 inch and an average particle strength of less than 10 pounds per particle and selected from the group consisting of coal, coke, brittle plastics, brittle glass, rubber, pliable plastics, tar and hydrogenated vegetable oils, and mixtures thereof, said particle-form material having a settling rate through said first carrier fluid in excess of 0.1 foot per minute, injecting said first mixture into said well bore, thence to said formation and into a fracture whose walls will exert sufficient force to cause said particle-form material to undergo physical alteration, forming a second mixture of a second carrier fluid and a fracture propping agent and injecting said second mixture into said well bore thence to said formation and into said fracture, and ceasing injection of said second carrier fluid to permit said fracture to close.

2. The method in accordance with claim 1 wherein the concentration of the particle-form material in the first carrier fluid is between 0.1 and 10 pounds per gallon of first carrier fluid.

3. The method in accordance with claim 1 wherein the settling rate of the particle-form material through the first carrier fluid is between 1 and 20 feet per minute.

4. The method in accordance with claim 1 wherein the minimum size of the particles of the deformable and crushable materials and mixtures thereof in addition to being at least 0.03 inch is at least as great as the minimum size of the fracture propping agent.

5. The method in accordance with claim 4 wherein the concentration of the particle-form material in the first carrier fluid is between 0.1 and 10 pounds per gallon of first carrier fluid.

6. The method in accordance with claim 4 wherein the settling rate of the particle-form material through the first carrier fluid is between 1 and 20 feet per minute.

References Cited by the Examiner

UNITED STATES PATENTS

| | | |
|---|---|---|
| 2,859,820 | 11/1958 | Trott. |
| 2,950,247 | 8/1960 | McGuire et al. _____ 166—42.1 |
| 2,959,223 | 11/1960 | Harmon _____ 166—42 |
| 2,962,095 | 11/1960 | Morse _____ 166—42 |
| 3,127,937 | 4/1964 | McGuire Jr. et al. ____ 166—42.1 |
| 3,155,159 | 11/1964 | McGuire Jr. et al. ____ 166—42.1 |

FOREIGN PATENTS 621,082   5/1961   Canada.

CHARLES E. O'CONNELL, Primary Examiner.

J. P. ROBINSON, T. A. ZALENSKI, Assistant Examiners.